United States Patent [19]

Castricum

[11] Patent Number: 5,257,521
[45] Date of Patent: Nov. 2, 1993

[54] APPARATUS AND METHOD FOR CUTTING SPIRAL PIPE

[75] Inventor: Wilhelmus P. H. Castricum, Palatine, Ill.

[73] Assignee: Spiro America, Inc., Wheeling, Ill.

[21] Appl. No.: 900,236

[22] Filed: Jun. 17, 1992

[51] Int. Cl.⁵ .............................................. B21C 37/12
[52] U.S. Cl. .......................................... 72/131; 72/49; 72/338; 83/54
[58] Field of Search ...................... 72/49, 50, 131, 129, 72/135, 338; 83/49, 39, 54, 193, 184, 180

[56] References Cited

U.S. PATENT DOCUMENTS

| | | |
|---|---|---|
| 957,966 | 5/1910 | Jenkins . |
| 1,478,692 | 12/1923 | Baranoff . |
| 1,635,807 | 7/1927 | Amberg . |
| 2,749,983 | 6/1956 | Rogers .................. 164/61 |
| 3,268,137 | 8/1966 | Martin ................... 225/2 |
| 3,831,470 | 8/1974 | Maroschak ............. 83/39 |
| 3,839,931 | 10/1974 | Herpich ................. 82/54 |
| 3,839,933 | 10/1974 | Paramonoff ............ 82/61 |
| 3,866,501 | 2/1975 | Glendenning et al. .. 83/54 |
| 3,913,430 | 10/1975 | van Dijk ................ 82/82 |
| 4,706,481 | 11/1987 | Castricum .............. 72/49 |
| 4,823,579 | 4/1989 | Castricum .............. 72/49 |
| 4,924,684 | 5/1990 | Castricum .............. 72/49 |
| 5,020,351 | 6/1991 | Castricum .............. 72/49 |

FOREIGN PATENT DOCUMENTS

| | | |
|---|---|---|
| 0353622 | 2/1990 | European Pat. Off. ......... 72/49 |
| 2724859 | 12/1978 | Fed. Rep. of Germany .... 83/54 |
| 2307605 | 12/1976 | France . |
| 718424 | 11/1954 | United Kingdom . |
| 784289 | 10/1957 | United Kingdom ........... 83/193 |
| 1555114 | 11/1979 | United Kingdom . |

Primary Examiner—Lowell A. Larson
Assistant Examiner—Michael J. McKeon
Attorney, Agent, or Firm—Willian Brinks Olds Hofer Gilson & Lione

[57] ABSTRACT

An apparatus and method for cutting a pipe includes first knife means having a cutting edge adjacent a surface of the pipe and second knife means having a cutting edge adjacent an opposite surface of the pipe. To cut the pipe, the first knife means is moved into an overlapping relation with the second knife means such that a first portion of the pipe is cut, the first knife means is retracted and rotated about the axis of the pipe into a position adjacent a second uncut portion thereof, and the first knife means is again moved into an overlapping relation with the second knife means such that a second portion of the pipe is cut.

25 Claims, 8 Drawing Sheets

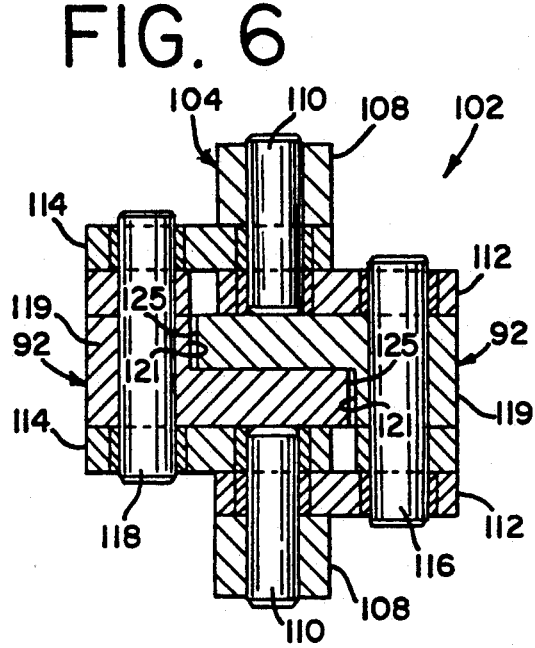
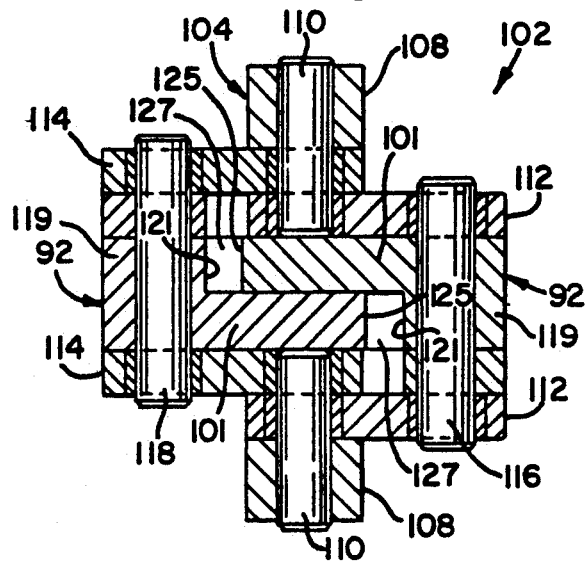
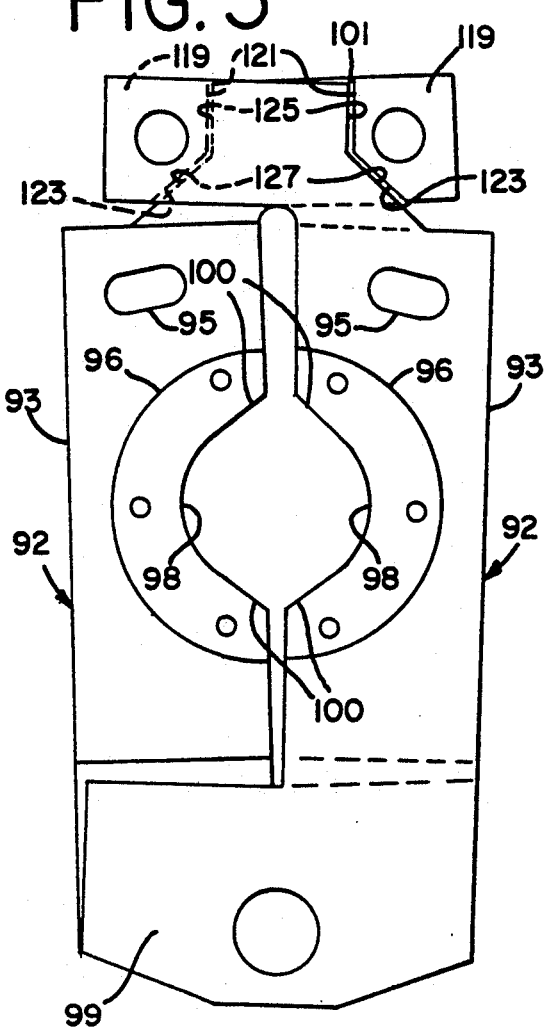
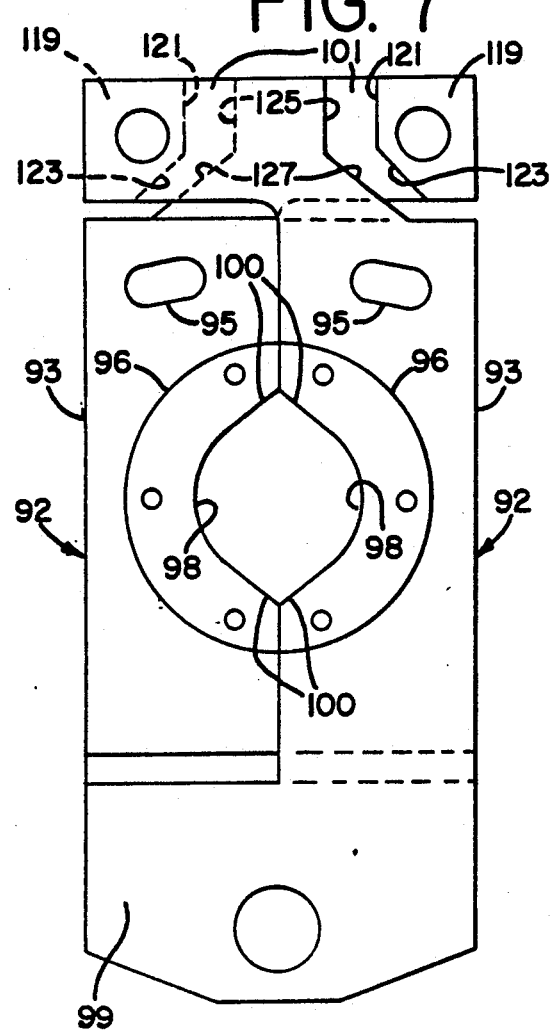

APPARATUS AND METHOD FOR CUTTING SPIRAL PIPE

BACKGROUND OF THE INVENTION

The present invention relates generally to an apparatus and method for cutting spirally formed pipe, and more particularly, to an apparatus and method for cleanly cutting a relatively heavy-gauge pipe or a pipe having a relatively thick helical seam.

Several machines use inner and outer cutters to sever a pipe or tube. These cutters are typically rotatable and have a convex or circular cutting edge for engaging the pipe. During the cutting operation, the pipe is rotated relative to the cutters or the cutter(s) are revolved around the periphery of the pipe.

Some pipe cutting machines use these types of cutters to sever a continuously formed spiral pipe having a helical seam. Cutting machines of this type are disclosed in my U.S. Pat. Nos. 4,706,481, 4,823,579 and 4,924,684, issued Nov. 17, 1987, Apr. 25, 1989 and May. 15, 1990. In those machines, an inner knife is attached to a boom, and an outer knife is positioned outside the pipe. To cut the pipe, the outer knife is moved into an overlapping relationship with the inner knife. As the pipe rotates and moves axially, the overlapping knives move axially with the pipe and cooperate to cut the pipe.

U.S. Pat. No. 957,966 discloses an apparatus which cuts a continuously wound spiral paper tube. A plurality of rotatable outer knives are moved inward to engage the tube. The outer knives move axially and rotate with the tube during the cutting operation.

In E.P. Patent 353,622, a pair of outer knives are slidably mounted in a rotary unit which is positioned inside a cam ring. When a desired length of pipe has been reached, the feed of strip and formation of pipe is halted. The rotary unit is moved axially and the outer knives are forced radially inward to engage the pipe. The rotary unit is then rotated and the outer knives cooperate with a mandrel to cut the pipe.

Other pipe cutting machines use such inner and outer cutters for severing a pre-cut length of pipe. The device disclosed in U.S. Pat. No. 2,749,983 includes a plurality of outer cutters positioned outside a pipe stock. To perform a cutting operation, the pipe is rotated, the outer cutters are manually advanced into the pipe, and a plurality of inner cutters are moved radially outward to engage the inside surface of the pipe. In U.S. Pat. No. 3,268,137, an outer cutter wheel is moved inward until it engages a pipe and the cutter wheel is rotated around the stationary pipe to perform a cut. U.S. Pat. No. 3,913,430 discloses a device for cutting rings from a pipe. The pipe is manually placed inside a die, inner cutters are moved radially outward by levers to engage an interior surface of the pipe, and the cutters are revolved around the circumference of the pipe. In U.S. Pat. No. 3,839,933, an internal circular trimmer knife is moved radially outward to penetrate the wall of a stationary can body. The trimmer knife revolves around the axis of the can and interfaces with against an outer cutter ring during the cutting operation.

U.S. Pat. No. 1,635,807 discloses annular shearing dies with central openings of a size to receive a tubular member. To sever the tubular member, one of the dies rotates about the tubular member to impart a shearing action around the wall of the tubular member along a circumferential line.

None of these machines facilitates cutting a heavy gauge pipe or a pipe having a relatively thick helical seam. It is difficult to penetrate and cleanly cut such a pipe by rotating the pipe relative to the cutters or revolving cutters around the periphery of the pipe. A greater force is required to penetrate a thick helical seam, and firm guidance is required due to the irregular surface created by the thicker seam. Moreover, the increased stress required to penetrate such a thick seam tends to inhibit the continuous formation of the spiral pipe.

SUMMARY OF THE INVENTION

Briefly stated, the invention is directed to an apparatus for cutting a pipe including first and second knife means. The first knife means has a cutting edge adjacent a surface of the pipe, and the second knife means having a cutting edge adjacent an opposite surface of the pipe. Means are provided for moving the first knife means in a generally radial direction between a standby position spaced apart from the pipe and a cutting position in overlapping relation with the second knife means. Means are also provided for rotating the first knife means about the axis of the pipe to allow a second portion of the pipe to be severed.

In a preferred embodiment, an outer cutter assembly is positioned outside the pipe and an inner knife is positioned inside the pipe. The inner knife has a circular cutting edge adjacent the entire periphery of an interior surface of the pipe. The outer cutter assembly preferably includes a pair of opposing outer knives having a concave cutting edge adjacent an exterior surface of the pipe. The cutting edge of each outer knife is of a sufficient length to cut at least a quarter of the circumference of the pipe. Thus, the opposing knives of the outer cutter assembly are moved into a cutting position in overlapping relation with the inner knife to cut at least half of the circumference of the pipe at a first cutting station, the opposing knives are retracted and rotated approximately 90° to a second cutting station, and the opposing knives are moved into the cutting position in overlapping relation with the inner knife to completely cut the pipe.

The present invention provides significant advantages over other pipe cutting machines. Since the outer knives penetrate the pipe in a generally normal direction rather than progressively engaging the entire circumference of the pipe, a greater force can be directly applied to penetrate heavy gauge pipe and pipes with a thick helical seam. Providing an impact load and eliminating tangential forces facilitates penetration and eliminates the need to guide a cutter around the irregular surface of the pipe.

The present invention, together with further objects and advantages, will be best understood by reference to the following detailed description taken in conjunction with the accompanying drawings.

BRIEF DESCRIPTION OF THE DRAWINGS

FIG. 5 is a rear view of the outer knives and outer knife holders shown in a standby position.

FIG. 6 is a cross-sectional view of the toggle members showing the outer knife holders in a standby position.

FIG. 7 is a rear view of the outer knives and outer knife holders shown in a cutting position.

FIG. 8 is a cross-sectional view of the toggle members showing the outer knife holders in a cutting position.

FIG. 12 is a front view of a fiber optic assembly and guide assembly.

DETAILED DESCRIPTION OF THE PREFERRED EMBODIMENTS

Figure 1:
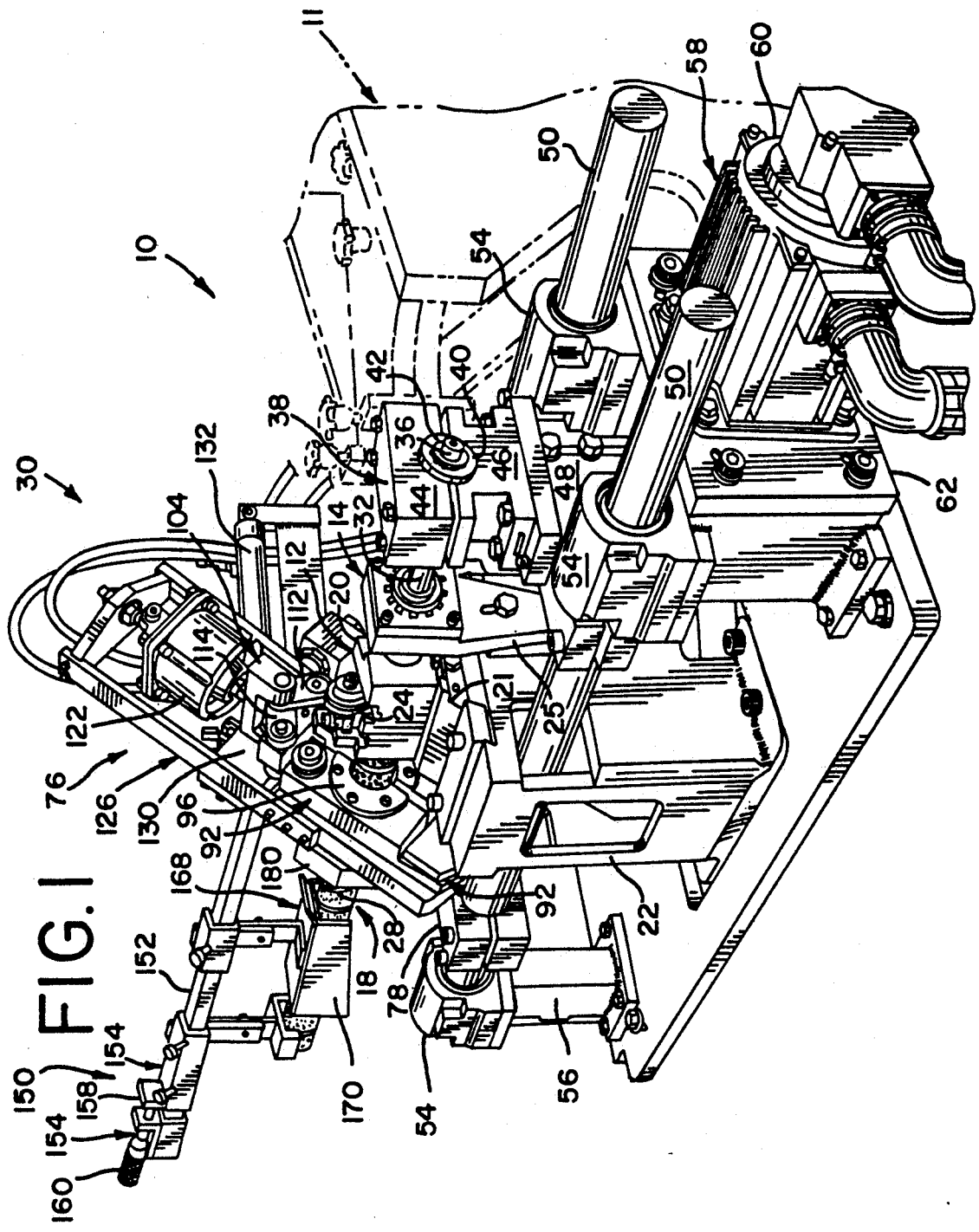
FIG. 1 is a perspective view of the preferred embodiment of the present invention.
Figure 2:
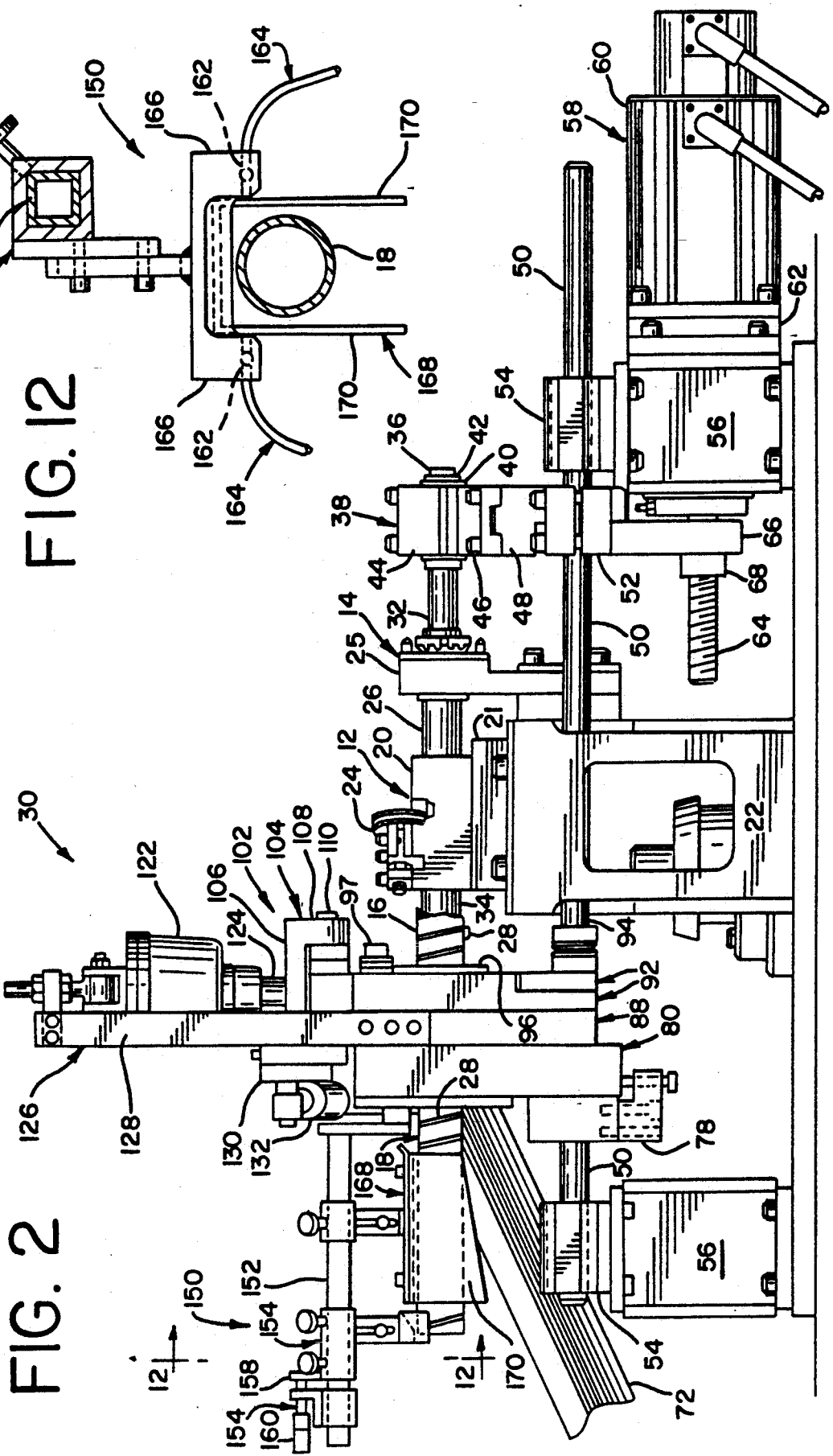
FIG. 2 is a side view of the preferred embodiment of the present invention.
Figure 3:
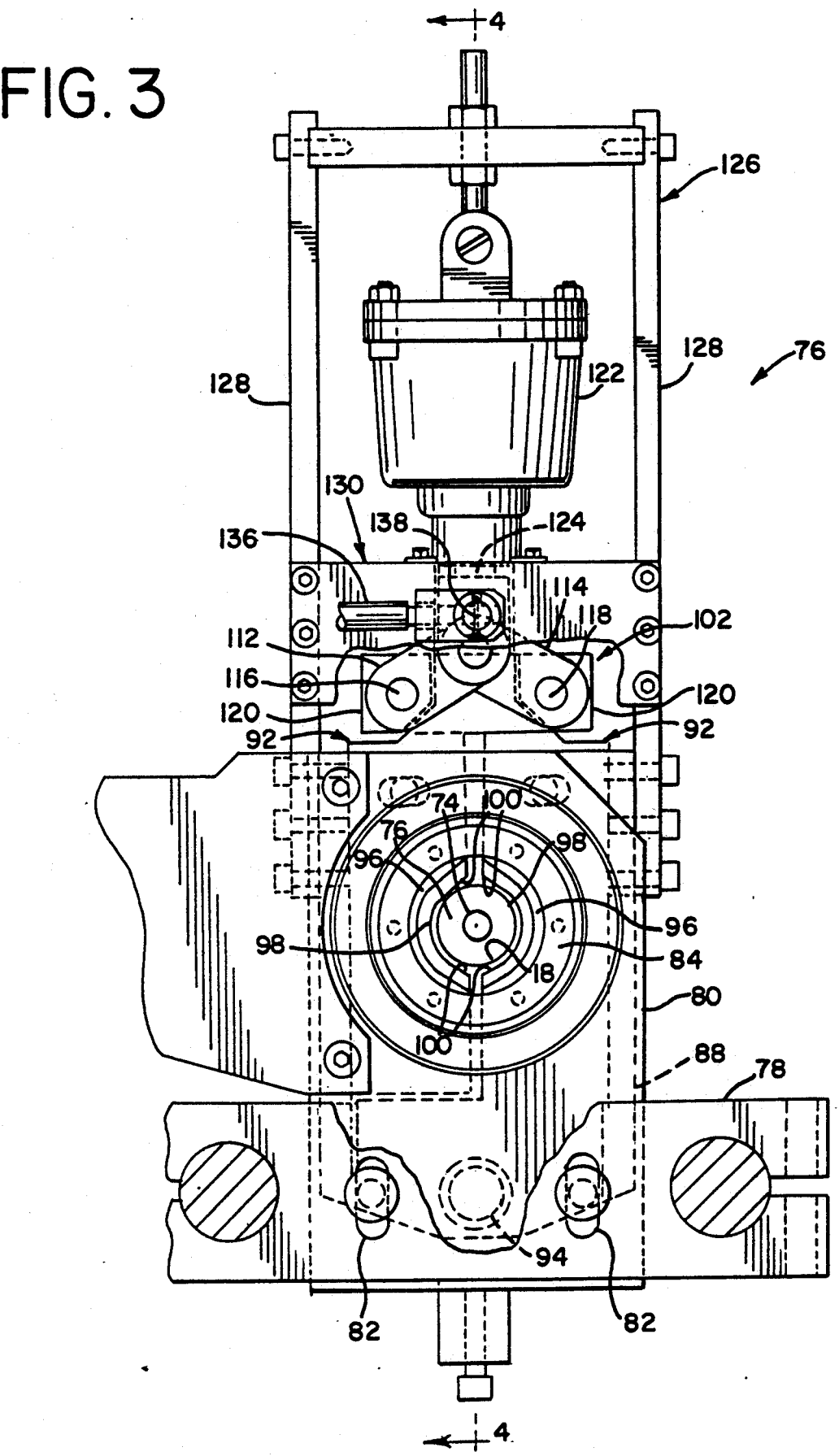
FIG. 3 is a front view of the invention showing an outer cutter assembly with outer knives in a standby position.

Referring to the drawings, FIGS. 1 and 2 show a pipe forming apparatus indicated generally at 10 in combination with a pipe cutting apparatus indicated generally at 30. The pipe forming apparatus 10 is described in greater detail in my pending U.S. patent application, Ser. No. 487,608, filed Mar. 2, 1990, the disclosure of which is specifically incorporated herein by reference.

The pipe forming apparatus 10 includes a strip forming machine 11, a forming head assembly 12, and a mandrel assembly 14. The forming head assembly 12 and mandrel assembly 14 cooperate to form a metal strip 16 into a spiral pipe 18. The forming head assembly 12 includes a forming head 20 and a base 21 which is detachably secured to a forming head table 22.

A folding roller (not shown) is located in the base 21 of the forming head assembly 12, and a lockseam closing roller 24 is positioned on top of the forming head 20. The mandrel assembly 14 includes a vertical holder assembly 25 and a cylindrical mandrel 26. The mandrel 26 is positioned inside the forming head 20 and the vertical holder assembly 25 allows the mandrel 26 to be passively rotatable about its centerline and pivotal in any radial direction.

Figure 13:
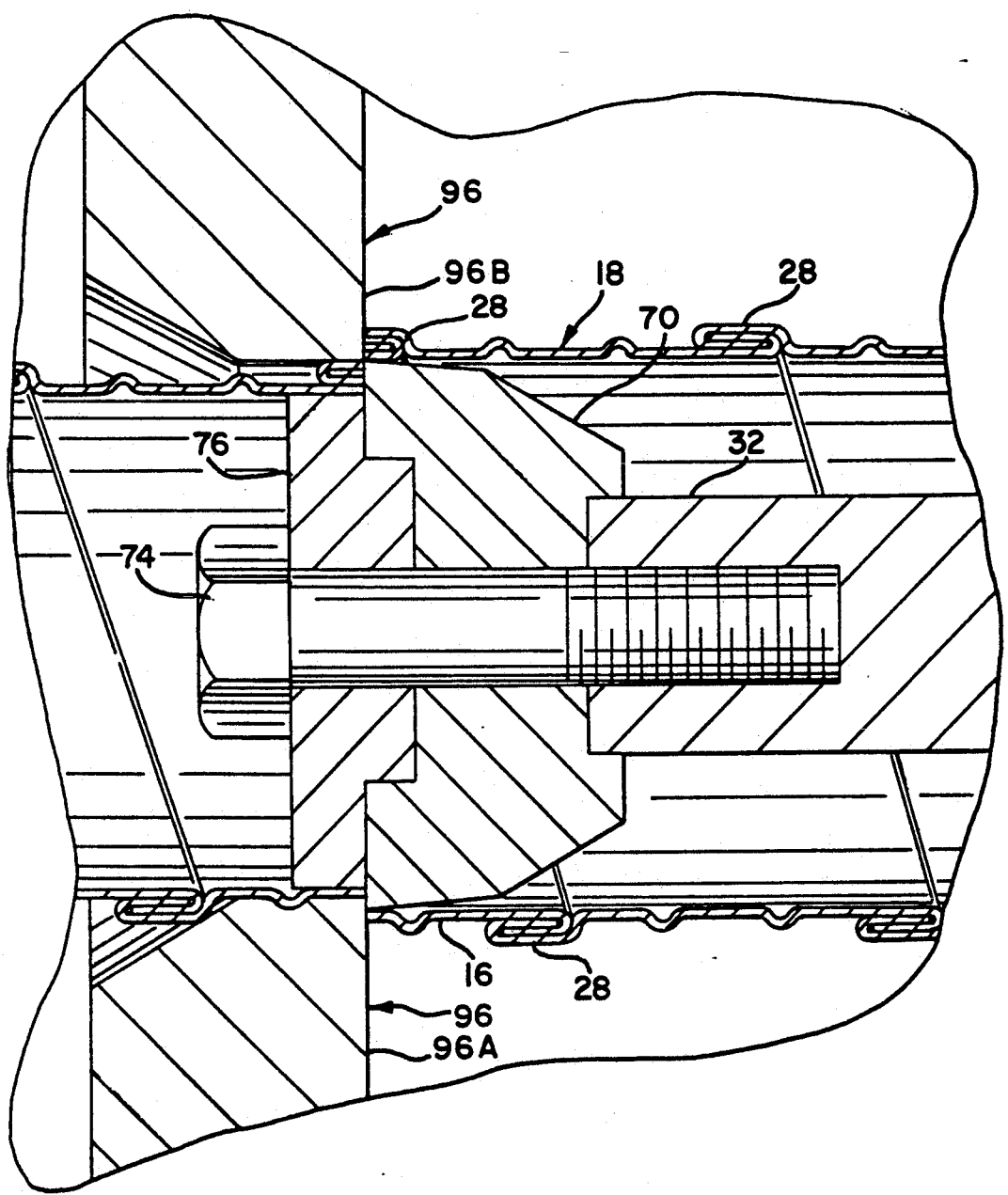
FIG. 13 is a fragmentary cross-sectional view of the inner and outer knives in a cutting position.

In the forming operation, the strip forming machine 11 feeds the metal strip 16 into the forming head assembly 12. The strip 16 is driven around the rotatable mandrel 26 and inside the forming head 20 in a helical manner, so that outer edges of the strip are positioned adjacent each other in helical fashion. The folding roller (not shown) folds the adjacent, mated edges of the helically wound strip. To form a tight, helical lockseam 28, the lockseam roller 24 compresses the folded strip edges against the mandrel 26. As best shown in FIG. 13, the strip edges are folded and compressed into three layers to create a lockseam 28 having a thickness which is four times greater than the thickness of the metal strip 16. Such a lockseam makes it difficult to cleanly cut the pipe 18 because it creates an uneven cutting surface and a greater force is required to penetrate the lockseam.

As the spiral pipe production continues, the pipe 18 moves out of the forming head 20 in a helical fashion, i.e. the pipe 18 moves in an axial direction while it rotates. If a relatively heavy gauge pipe 18 is desired, a metal strip 16 of a desired thickness is fed into the forming head 20. However, cutting through relatively heavy gauge pipe has also posed a difficult problem for conventional cutting machines. Moreover, the increased thickness of the lockseam 28 due to the heavier gauge pipe makes it even more difficult to cut the pipe. Although the present cutting apparatus will be described in conjunction with the foregoing forming apparatus, it can be used with any pipe-forming apparatus.

The preferred embodiment of the present pipe cutting apparatus 30 includes many elements of the cutting machines disclosed in my U.S. Pat. No. 4,924,684, issued May 15, 1990, and my U.S. Pat. No. 5,193,374, issued Mar. 16, 1993. The description of the cutting apparatus contained in those documents are specifically incorporated herein by reference and made a part hereof.

A shaft 32 is positioned inside the mandrel 26 and has a forward end 34 extending forwardly of the forming head assembly 12 and an aft end 36 supported by a shaft holder assembly 38. The shaft 32 can be rotatably or fixedly attached to the shaft holder assembly 38, and a lock washer 40 and lock nut 42 are attached to the end 36 to prevent any axial movement of shaft 32 relative to the shaft holder assembly 38. The shaft holder assembly 38 has an upper section 44 clamped to a lower section 46 which is mounted on an attachment block 48. The attachment block 48 passes between guide bars 50 and is secured to a guide bar connector 52 so that the bar connector 52, attachment block 46, and shaft holder assembly 38 slide axially with the guide bars 50. The guide bars 50 pass through openings in the forming head table 22, and slide through bearing housings 54, which include THK Slide Bearing SC 25 Assemblies. There are four such bearing housings 54, each of which is attached to the top of a mounting leg 56.

To move the guide bars 50 and all their connected components in the axial direction of the pipe 18 during the cutting operation, a servo motor assembly 58 is provided. As best shown in FIG. 2, this assembly 58 includes a servo motor 60, a base 62, and a ball screw 64. The base 62 is attached to the mounting legs 56 and the ball screw 64 is secured to a piece of flat stock 66 by a ball nut 68. The flat stock 66 is attached to the central portion of the attachment block 48. During the cutting operation, the motor 60 rotates the ball screw 64 is one direction, and the ball screw cooperates with the ball nut 68 to push the flat stock 66, the attachment block 48, the guide bars 50, and all their connected components, including inner and outer knives, in the axial direction of the pipe 18.

Figure 4:
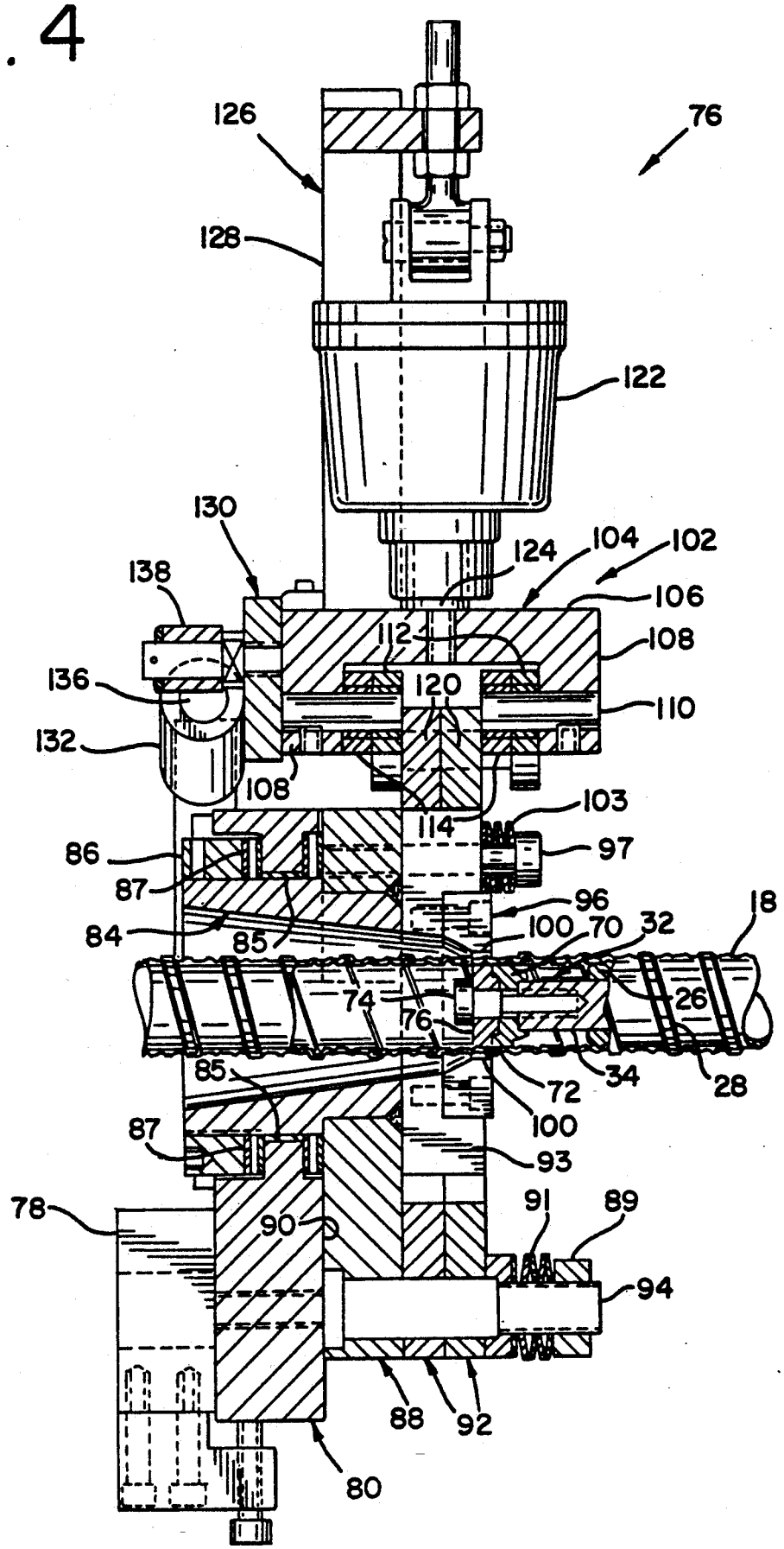
FIG. 4 is a cross-sectional view of the cutter assembly taken along the line 4—4 in FIG. 3.
Figure 9:
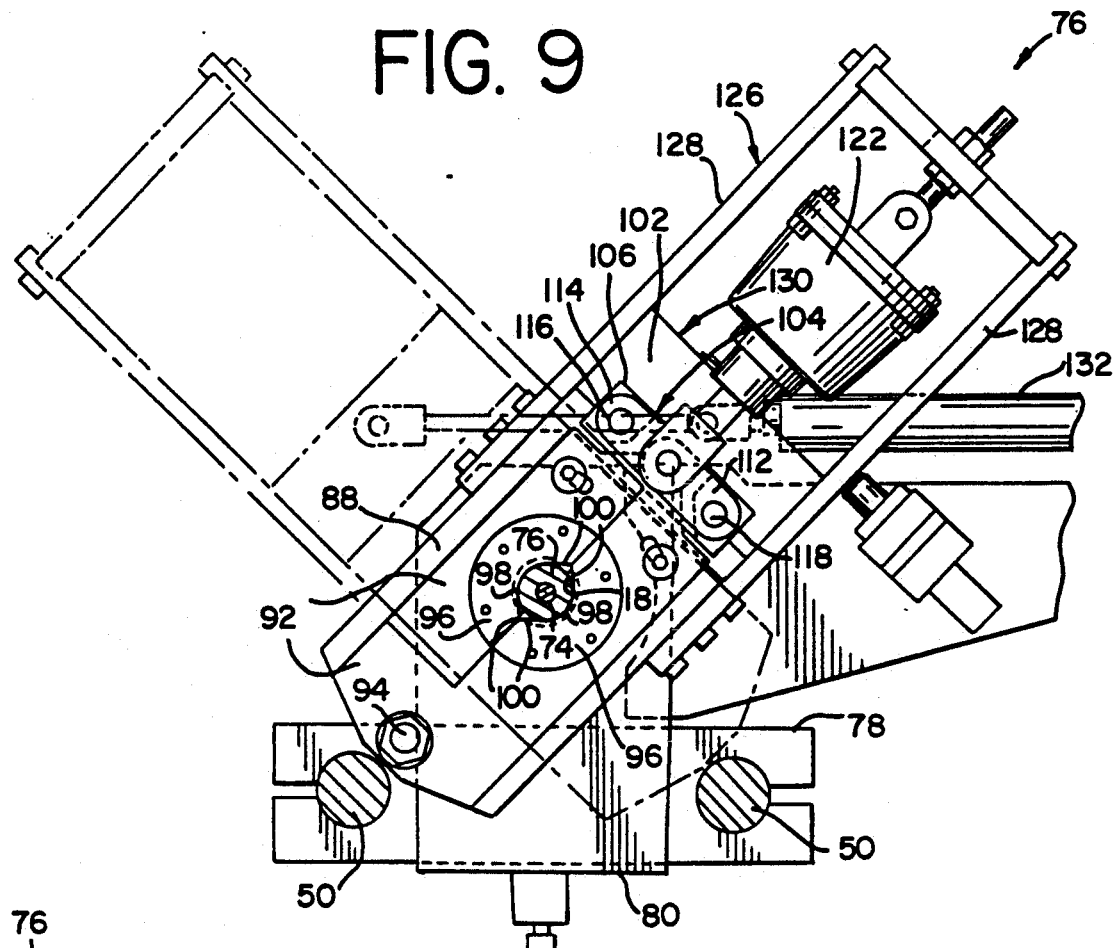
FIG. 9 is a rear view of the outer cutter assembly showing the outer knives in a cutting position at a first cutting station.
Figure 10:
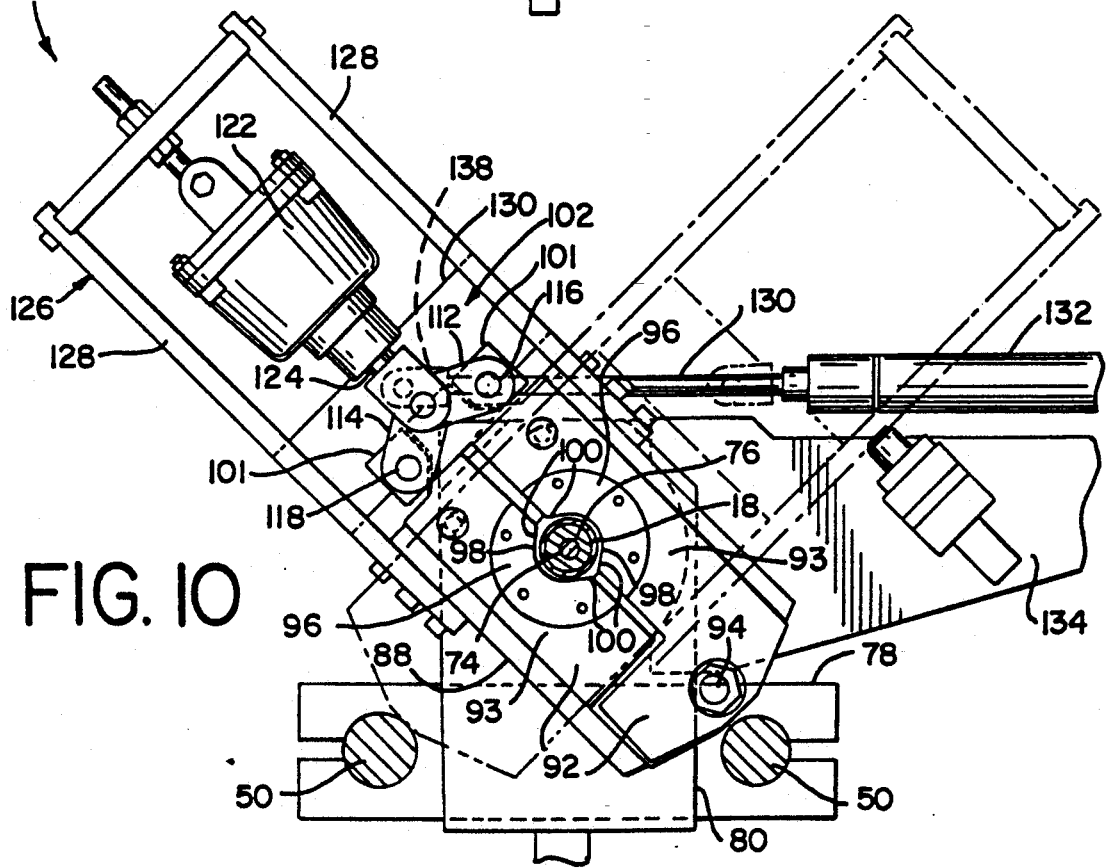
FIG. 10 shows the outer cutter assembly in FIG. 9 at a second cutting station with the outer knives in a retracted standby position.
Figure 11:
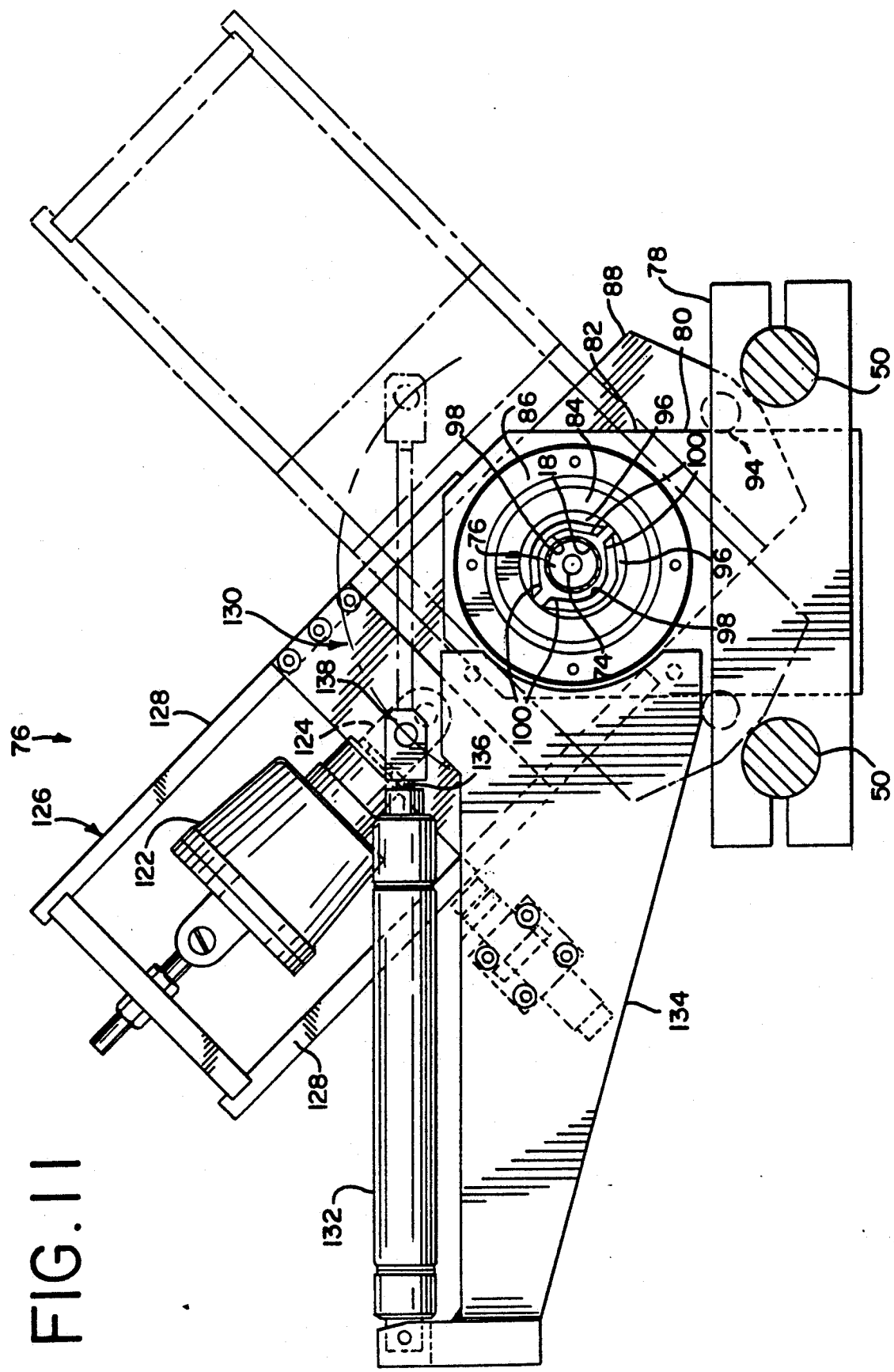
FIG. 11 is a front view of the outer cutter assembly shown in FIG. 9.

Referring now to FIG. 4, an inner knife 70 is mounted to the forward end 34 of the shaft 32 by a bolt 72, and a washer 74 is positioned between the bolt 72 and the inner knife 70. The inner knife 70 preferably has a circular cutting edge 76 which is slightly smaller in diameter than the inner diameter of the pipe 18 to provide a cutting edge adjacent the entire interior periphery of the pipe 18.

As shown in FIGS. 1-4 and 9-11, an outer cutter assembly 76 is positioned adjacent the inner knife 70 and is secured to the guide bars 50 by a guide bar connector 78. The outer cutter assembly 76 includes a bearing holder 80 which is attached to the guide bar connector 78 by conventional fasteners. Preferably, the bar connector 78 has a pair of elongated slots 82 therein to allow vertical adjustment of the bearing holder 80. A substantially cylindrical shaft 84 is positioned within the bearing holder 80 and is rotatably held therein by a sleeve bearing 85 and a plurality of thrust bearings 87. A locknut 86 is mounted to a front portion of the shaft 84 to retain the bearings 85 and 87 within the holder 80 and restrain axial motion of the shaft 84. A base plate 88 extends radially from a rear portion of the shaft 84 such that a front surface 90 thereof slidably bears against the bearing holder 80.

A pair of opposing knife holders 92 are pivotally attached to a bottom portion of the base plate 88 by a pivot rod 94 having an axis in vertical alignment with the center of the pipe 18. To hold the knife holders 92 together while allowing pivotal movement thereof, a nut 89 is tightened a desired amount to compress a spring washer 91. Each knife holder 92 has a middle section 93 which slidably bears against the base plate 88. An outer half ring-like knife 96 is mounted in each knife holder middle section 93 and an elongated slot 95 (FIGS. 5 and 7) is formed in an upper portion of each middle section 93. The slots 95 receive bolts 97 which are tightened a desired amount to compress corresponding spring washers 103 to hold the knife holders 92 together while allowing pivotal movement thereof.

Referring now to FIGS. 3 and 5-9, the outer knives 96 have a concave cutting edge 98 adjacent an exterior surface of the pipe 18. To avoid pinching the pipe 18 and creating a crimp, the cutting edges 98 preferably have a recess 100 formed in the outermost portions thereof. Each knife holder 92 also has an inwardly extending lower leg 99 and upper arm 101 approximately half the thickness of the middle section 93. When the knife holders 92 are pivoted in opposite directions about the pivot rod 94, the overlapping legs 99 and arms 101 slidably bear against each other.

To pivot the outer knives 96 between a standby position in which the cutting edges 98 are spaced apart from the pipe 18 (FIGS. 1, 3, 5, 6 and 10) and a cutting position in which the cutting edges 98 are in overlapping relation with the inner knife 70 (FIGS. 7-9), a toggle assembly 102 is provided. The toggle assembly 102 includes a housing 104 having a plate 106 and downwardly extending side walls 108. A pair of pivot bars 110 extend perpendicularly inward from the walls 108. A first and second pair of toggles 112, 114 are rotatably attached to the pivot bars 110. The first pair of toggles 112 extend radially outward from the corresponding bar 110 in the same direction and are interconnected by a first pin 116. Likewise, the second pair of toggles 114 extend radially outward from the other bar 110 in a generally opposite direction and are interconnected by a second pin 118. The arm 101 of each knife holder 92 extends past the plane created by the knife holder pivot rod 94 and toggle assembly pivot bars 110 for rotatable attachment to the corresponding opposite toggle pin 116 or 118. To provide a stop for limiting the pivotal movement of the knife holders 92 away from each other, block members 119 extend perpendicularly from end portions of the arms 101. Each block member 119 has a substantially vertical surface 121 and an angled surface 123 for bearing against corresponding surfaces 125, 127 of a shoulder portion of the opposite arm 101 (FIGS. 5-8).

To move the knife holders 92 between the cutting and standby positions, a pneumatic cylinder 122 is provided having a piston rod 124 attached to the plate 106 of the toggle housing 104. In the standby position, the piston rod 124 is withdrawn to raise the pivot bars 110 relative to the toggle pins 116 and 118. As a result, the toggles 112, 114 pull the pins 116, 118 and the arms 101 of the knife holders 92 toward each other. Since the arms 101 of each knife holder 92 extends past the plane created by the pivot rod 94 and bar 104, the drawing of the arms 101 together spreads the knife holders 92 apart to a position in which the cutting edge 98 of the outer knives 96 is spaced apart from the pipe 18. To move the knife holders 92 and outer knives 96 to the cutting position is overlapping relation with the inner knife 70, the piston rod 124 extends out of the cylinder 122. Thus, the toggle pins 116 and 118 are forced apart and the knife holders 92 and outer knives 96 are drawn together with sufficient force to cleanly penetrate heavy gauge pipe or pipe having a thick helical seam.

As illustrated in FIG. 13, only one of the outer knives 96 will contact the helical lockseam 28, which is four times as thick as the metal strip 16. Since the lockseam 28 provides more resistance to penetration than the single-thickness metal strip 16 on the opposite side of the pipe 18, and the outer knives 96 move inwardly with approximately the same force, outer knife 96A easily cuts through the pipe 18 and tends to move further inward than outer knife 96B. As a result, the outer knife holders 92 tend to shift and the outer knife 96B may not be able to penetrate the lockseam 28. To limit the inward movement of knife 96A and balance the resistant forces acting against the outer knives 96, the difference between the radii of the inner knife 70 and the washer 76 is approximately the same as the thickness of the lockseam 28. Thus, the outer knife 96A bears against the washer 76 after it penetrates the metal strip 16, which prevents shifting of the outer knife holders 92 and allows the outer knife 96B to move inward an adequate distance with sufficient force to penetrate the lockseam 28.

To rotate the outer knives between a first cutting station and a second cutting station (FIGS. 9-11), the cylinder 122 is attached to a bracket 126. The bracket 126 includes parallel side members 128 connected to the shaft base plate 88 and a cross-plate 130 therebetween. A second pneumatic cylinder 132 is mounted to the stationary bearing holder 80 by a support arm 134. The cylinder 132 has a piston rod 136 extending therefrom with an end 138 attached to the cross-plate 130. The piston rod 136 causes the shaft plate 88 and its connected components, including the cylinder 122, toggle assembly 102, and outer knives 96, to rotate approximately 90° between the first and second cutting stations. Thus, the outer knives 96 move between the standby and cutting positions at each cutting station to sever a portion of the pipe 18.

The outer knives 96 are preferably configured so that the cutting edges 98 thereof cut at least one quarter of the pipe 18 at each cutting station, thereby severing the pipe after only one 90° rotation of the cutter assembly 76. However, the pipe cutting apparatus 30 can be configured such that the outer knives 96 cut a smaller portion of the pipe 18 at each station which would require corresponding angular rotations of the cutter assembly 76. Furthermore, the inner knife 70 can comprise two separate halves which move radially outward to cut opposite portions of the pipe 18 at a first cutting station, retract inward to a standby position, rotate to a second cutting station, and again move outward to completely cut the pipe 18.

To initiate the cutting operation, a fiber optic assembly 150 is provided (FIGS. 1, 2 and 12). A horizontal bar 152 is adapted to be fixedly mounted to the bearing holder 80 or other stationary component of the cutting apparatus. The bar 152 extends forward past a leading edge of the pipe 18, and a calibrator 154 is positioned on an end portion thereof. A vertically adjustable bracket 156 is slidably attached to the bar 152 and includes an upwardly extending flange 158 for engagement with the calibrator 154. To position the bracket 156 at an axial distance away from the inner and outer knives 70 and 92 corresponding to a desired length of pipe to be cut, a knob 160 of the calibrator is turned an appropriate amount. As best shown in FIG. 12, end portions 162 of an optic fiber 164 are attached to spaced apart side members 166 of the bracket 156. The fiber end portions 162 are horizontally aligned so that the encroachment of a leading edge of the pipe 18 therebetween initiates the cutting operation.

In addition, a vertically adjustable pipe guide 168 having downwardly extending vertical flanges 170 is slidably mounted to the bar 152, and a slide 172 is positioned adjacent the cutting apparatus 30 at an angle so that severed sections of pipe 18 fall into the slide 172 and slide downward to a receptacle (not shown). Moreover, the pipe guide 168 and fiber optic assembly bracket 156 can be releasably attached to the bar 152 by conventional fastening means such as set screws, nuts and bolts, or the like.

In operation, the pipe 18 moves forwardly in an axial direction and rotates until a leading edge thereof encroaches the optic line created by the optic fibers 164. A begin-cut signal is sent to a motion control unit (not shown) which causes the pipe forming machine 11 to stop feeding the metal strip 16 into the forming head assembly 12. As a result, the axial motion and rotation of the pipe 18 is stopped. At about the same time, the piston rod 124 extends out of the cylinder 122, thus forcing the toggle pins 116 and 118 apart and drawing the knife holders 92 and outer knives 96 together in overlapping relation with the inner knife 70 to cut opposite portions of the pipe 18. The piston rod 124 is then retracted into the cylinder 122 to move the outer knives 96 apart to the standby position.

The entire cutter assembly 76 is then rotated approximately 90° to the second cutting station by the second pneumatic cylinder 132, and the outer knives 96 are again moved into the cutting position by the first pneumatic cylinder 122 to completely cut the pipe 18. To position the cutter assembly 76 for a new cutting operation, the outer knives 96 are moved to the standby position, and the cutter assembly 76 is rotated to the first cutting station. When the cutter assembly has reached the first cutting station, the pipe forming machine 11 begins to feed the metal strip into the forming head, thereby resuming axial and rotational movement of pipe 18 until the leading edge thereof has again reached the optic fibers 164.

Thus, a pipe cutting apparatus is provided which easily penetrates and cleanly severs heavy gauge pipe and pipes having a thick helical seam.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the following claims, including all equivalents thereof, which are intended to define the scope of the invention.

I claim:

1. An apparatus for cutting a pipe comprising:
   a first knife having a cutting edge adjacent a surface of the pipe;
   a second knife having a cutting edge adjacent an opposite surface of the pipe;
   a mechanism for moving the first knife in a generally radial direction between a standby position in which said first knife is spaced apart from the pipe and a cutting position in which said first knife is in an overlapping relation with the second knife; and
   a mechanism for rotating the first knife about the axis of the pipe when said first knife is in the standby position;
   whereby the first knife is moved into an overlapping relation with the second knife such that a first portion of the pipe is cut, the first knife is retracted and rotated about the axis of the pipe into a position adjacent a second uncut portion thereof, and the first knife is moved into an overlapping relation with the second knife such that a second portion of the pipe is cut.

2. The apparatus of claim 1, wherein the means for moving the first knife in a radial direction is adapted to rotate about the axis of the pipe with said first knife.

3. The apparatus of claim 1, wherein the first knife comprises opposing knives which cut opposite portions of the pipe when moved radially into the cutting position.

4. The apparatus of claim 3, wherein the cutting edge of each opposing knife is a sufficient length to cut at least a quater of the circumference of the pipe, whereby the opposing knives are moved into a cutting position in overlapping relation with the second knife to cut at least half of the circumference of the pipe, the opposing knives are retracted and rotated approximately 90°, and the opposing knives are again moved into the cutting position in overlapping relation with the second knife to completely cut the pipe.

5. The apparatus of claim 1, further comprising control device for actuating the first knife and the pipe such that the pipe stops moving and the first knife move in response to a signal corresponding to a predetermined length of pipe, and the first knife stop moving when in the standby position after a complete cut and the pipe begins moving when the first knife are in said standby position.

6. The apparatus of claim 1, wherein the first knife comprises an outer cutter assembly positioned outside the pipe, said cutter assembly including at least one outer knife having a concave cutting edge adjacent an exterior surface of the pipe, and the second knife comprises an inner knife positioned inside the pipe, said inner knife having a circular cutting edge adjacent the entire periphery of an interior surface of the pipe.

7. An apparatus for cutting a spiral pipe which moves in an axial direction and rotates while it is being formed, the apparatus comprising:
   an outer cutter assembly positioned outside the pipe, said cutter assembly including a pair of opposing outer knives having a concave cutting edge adjacent an exterior surface of the pipe;
   an inner knife positioned inside the pipe and having a circular cutting edge adjacent the entire periphery of an interior surface of the pipe;
   means for moving the outer knives in a generally radial direction between a standby position in which the outer knives are spaced apart from the pipe and a cutting position in which the outer knives are in overlapping relation with the inner knife; and means for rotating the outer knives about the axis of the pipe;

whereby the axial movement and rotation of the pipe is stopped, the outer knives are moved radially inward to cut a first portion of the pipe, the outer knives are moved radially outward and rotated about the axis of the pipe such that the cutting edges of the outer knives are adjacent a second uncut portion of the pipe, and the outer knives are moved radially inward to cut said second portion of the pipe.

8. The apparatus of claim 7, wherein the means for moving the first knife means in a radial direction is adapted to rotate about the axis of the pipe with said first knife means.

9. The apparatus of claim 7, further comprising control means for actuating the outer knives and the pipe such that the pipe stops moving and the outer knives move in response to a signal corresponding to a predetermined length of pipe, the outer knives stop moving when in the standby position after a complete cut, and the pipe begins moving when the outer knives are in said standby position after a complete cut.

10. The apparatus of claim 7, wherein the inner knife is attached to an end of a shaft positioned inside the pipe.

11. The apparatus of claim 7, wherein the cutting edge of each outer knife is a sufficient length to cut at least a quarter of the circumference of the pipe, whereby the opposing knives are moved into a cutting position in overlapping relation with the inner knife to cut at least half of the circumference of the pipe, the outer knives are retracted and rotated approximately 90°, and the outer knives are again moved into the cutting position in overlapping relation with the inner knife to completely cut the pipe.

12. The apparatus of claim 11, wherein the outer cutter assembly further comprises a cylindrical bearing surrounding the pipe, said bearing being positioned within a bearing holder and having a base plate attached to an end portion thereof, and wherein said rotation means and outer knives are adapted to be connected to the base plate, whereby the rotation means rotates the base plate and bearing within the bearing holder to move the outer knives between a first and second cutting station.

13. The apparatus of claim 12, wherein the outer cutter assembly further comprises a pair of knife holders pivotally attached to said base plate, each knife holder having one of said outer knives mounted therein, and said means for moving the outer knives includes toggle means adapted to move said knife holders between said cutting and standby positions.

14. An apparatus for cutting a spiral pipe which moves in an axial direction and rotates while it is being formed, the apparatus comprising:

an inner knife attached to an end of a shaft positioned inside the pipe, said inner knife having a circular cutting edge adjacent the entire periphery of an interior surface of the pipe;

an outer cutter assembly positioned outside the pipe, said cutter assembly including a pair of opposing outer knives having a concave cutting edge adjacent an exterior surface of the pipe, the cutting edge of each outer knife being a sufficient length to cut at least a quarter of the circumference of the pipe;

means for rotating the outer knives about the axis of the pipe;

means for moving the outer knives in a generally radial direction between a standby position in which the outer knives are spaced apart from the pipe and a cutting position in which the outer knives are in overlapping relation with the inner knife, said moving means being adapted to rotate with the outer knives; and control means for actuating the outer knives and the pipe such that the pipe stops moving and the outer knives move in response to a signal corresponding to a predetermined length of pipe, the outer knives stop moving when in the standby position position after a complete cut, and the pipe begins moving when the outer knives are in said standby position after a complete cut;

whereby the axial movement and rotation of the pipe is stopped, the outer knives are moved radially inward to a cutting position in overlapping relation with the inner knife to cut at least half of the circumference of the pipe, the outer knives are retracted and rotated approximately 90°, and the outer knives are moved into the cutting position in overlapping relation with the inner knife to completely cut the pipe.

15. The apparatus of claim 14, wherein the outer cutter assembly further comprises a cylindrical bearing surrounding the pipe, said bearing being positioned within a bearing holder and having a base plate attached to an end portion thereof, and wherein said rotation means and outer knives are adapted to be connected to the base plate, whereby the rotation means rotates the base plate and bearing within the bearing holder to move the outer knives between a first and second cutting station.

16. The apparatus of claim 15, wherein the outer cutter assembly further comprises a pair of knife holders pivotally attached to said base plate, each knife holder having one of said outer knives mounted therein, and said means for moving the outer knives includes toggle means adapted to move said knife holders and knives therein between said cutting and standby positions.

17. The apparatus of claim 16, wherein the toggle means comprise a plate having side members depending from ends thereof, a bar interconnecting said side members, a first and second pair of spaced apart toggles rotatably attached to the bar, said first toggles extending radially outward from the bar in the same direction and being interconnected by a first pin, said second toggles extending radially outward from the bar generally in an opposite direction and being interconnected by a second pin, one of the knife holders having a portion rotatably connected to the first pin, and the other of said knife holders having a portion rotatably connected to the second pin, and wherein the means for moving the outer knives further comprises a cylinder having a piston with one end thereof attached to said toggle plate, the cylinder being adapted to rotate with the bearing base plate, whereby the piston moves in one direction to move the knife holders to the cutting position, the piston moves in an opposite direction to move the knife holders to the standby position, and the cylinder, toggle means, and outer knife holders are rotated by the rotation means.

18. An apparatus for cutting a spiral pipe which moves in an axial direction and rotates while it is being formed, the apparatus comprising:

an inner knife attached to an end of a shaft positioned inside the pipe, said inner knife having a circular cutting edge adjacent the entire periphery of an interior surface of the pipe;

an outer cutter assembly positioned outside the pipe, said cutter assembly including a cylindrical bearing surrounding the pipe and positioned within a bearing holder having a base plate attached to an end portion thereof, the base plate having a pair of opposing knife holders pivotally attached thereto, each knife holder having an outer knife mounted therein, and said outer knives having a concave cutting edge adjacent an exterior surface of the pipe of a sufficient length to cut at least a quarter of the circumference of the pipe;

rotation means adapted to be connected to the bearing base plate to rotate said outer knives about the axis of the pipe between a first and second cutting station;

means for moving the outer knives in a generally radial direction between a standby position in which the outer knives are spaced apart from the pipe and a cutting position in which the outer knives are in overlapping relation with the inner knife, said moving means including toggle means adapted to move the knife holders and knives therein between the cutting and standby positions, and said moving means also being adapted to rotate with the outer knives; and control means for actuating the outer knives and the pipe such that the pipe stops moving and the outer knives move in response to a signal corresponding to a predetermined length of pipe, the outer knives stop moving when in the standby position after a complete cut, and the pipe begins moving when the outer knives are in said standby position after a complete cut;

whereby the axial movement and rotation of the pipe is stopped, the outer knives are moved radially inward to the cutting position in overlapping relation with the inner knife to cut at least half of the circumference of the pipe, the outer knives are retracted and rotated approximately 90° to the second cutting station, and the outer knives are moved into the cutting position in overlapping relation with the inner knife to completely cut the pipe.

19. The apparatus of claim 18, wherein the toggle means comprise a plate having side members depending from ends thereof, a bar interconnecting said side members, a first and second pair of spaced apart toggles rotatably attached to the bar, said first toggles extending radially outward from the bar in the same direction and being interconnected by a first pin, said second toggles extending radially outward from the bar generally in an opposite direction and being interconnected by a second pin, one of the knife holders having a portion rotatably connected to the first pin, and the other of said knife holders having a portion rotatably connected to the second pin, and wherein the means for moving the outer knives further comprises a cylinder having a piston with one end thereof attached to said toggle plate, the cylinder being adapted to rotate with the bearing base plate, whereby the piston moves in one direction to move the knife holders to the cutting position, the piston moves in an opposite direction to move the knife holders to the standby position, and the cylinder, toggle means, and outer knife holders are rotated by the rotation means between the first and second cutting stations.

20. A method of cutting a spiral pipe which moves in an axial direction and rotates while it is being formed, the method comprising:

stopping the axial movement and rotation of the pipe when it reaches a desired length;

moving first knife means in a generally radial direction to a cutting position in overlapping relation with second knife means, whereby a first portion of the pipe is cut;

retracting the first knife means from said cutting position;

rotating the first knife means about the axis of the pipe into a position adjacent a second uncut portion thereof;

moving the first knife means in a generally radial direction to the cutting position in overlapping relation with the second knife means, whereby the second portion of the pipe is cut; and retracting the first knife means.

21. The method of claim 20, wherein the first knife means comprises opposing knives, and the step of moving the first knife means into the cutting position comprises moving each opposing knife in overlapping relation with the second knife means to cut opposite portions of the pipe.

22. The method of claim 21, wherein the cutting edge of each opposing knife is a sufficient length to cut at least a quarter of the circumference of the pipe such that half of the circumference of the pipe is cut when the knives are moved into the cutting position, and the step of rotating the first knife means comprises rotating the opposing knives approximately 90°.

23. The method of claim 20, further comprising control means for actuating the first knife means and the pipe such that the pipe stops moving and the first knife means move in response to a signal corresponding to a predetermined length of pipe, and the first knife means stops moving when it is in the standby position after a complete cut and the pipe begins moving when the first knife means is in said standby position.

24. The method of claim 20, wherein the first knife means is positioned outside the pipe and the second knife means is positioned inside the pipe.

25. The method of claim 20, wherein the first knife means is positioned inside the pipe and the second knife means is positioned outside the pipe

* * * * *

UNITED STATES PATENT AND TRADEMARK OFFICE
CERTIFICATE OF CORRECTION

PATENT NO. : 5,257,521
DATED : November 2, 1993
INVENTOR(S) : Wilhelmus P.H. Castricum It is certified that error appears in the above-indentified patent and that said Letters Patent is hereby corrected as shown below:

In column 1, line 61, delete "against".

In column 6, line 3, delete "extends" and substitute therefor --extend--.

Column 8:
In claim 4, line 31, delete "quater" and substitute therefor --quarter.
In claim 5, line 41, after "knife" delete "move" and substitute therefor --moves--; line 43, after "knife" delete "stop" and substitute therefor --stops--; line 45, after "knife" delete "are" and substitute therefor --is--.

Signed and Sealed this

Nineteenth Day of July, 1994

Attest:

BRUCE LEHMAN

*Attesting Officer*　　　　*Commissioner of Patents and Trademarks*